Nov. 10, 1925.  
T. SHETKA  
1,560,867  
CONTROL FOR FLOAT VALVES  
Filed May 25, 1925

Inventor  
Thomas Shetka  
By Stryker & Stryker  
Attorneys

Patented Nov. 10, 1925.

1,560,867

UNITED STATES PATENT OFFICE.

THOMAS SHETKA, OF ST. PAUL, MINNESOTA.

CONTROL FOR FLOAT VALVES.

Application filed May 25, 1925. Serial No. 32,636.

*To all whom it may concern:*

Be it known that I, THOMAS SHETKA, a citizen of the United States, residing at St. Paul, in the county of Ramsey and State of Minnesota, have invented new and useful Improvements in Controls for Float Valves, of which the following is a specification.

This invention relates to controls for float valves, particularly, although not exclusively, adapted for use where it is necessary or desirable to obtain rapid filling of a storage tank, and silent operation of the valve.

Float valves of the type in general use upon water closets are so constructed that in their normal operation considerable time is required to fill the storage tank, and objectional noise is produced during the filling of the tank. Both of these undesirable features have resulted from construction whereby the valve opening, during the inflow of water, has been gradually reduced as the water approaches its high level. This throttling of the inflowing water creates a hissing noise and is inefficient because the valve is only allowed to remain fully opened for a small part of the time required to fill the tank.

It is my object to obviate these defects by providing a simple and inexpensive attachment for a float valve of this type, whereby the valve is maintained open to its maximum until the water has risen to a predetermined level, when the valve is closed. This invention also includes certain novel features of construction which will be more fully pointed out in the following specification and claims.

Figure 1:
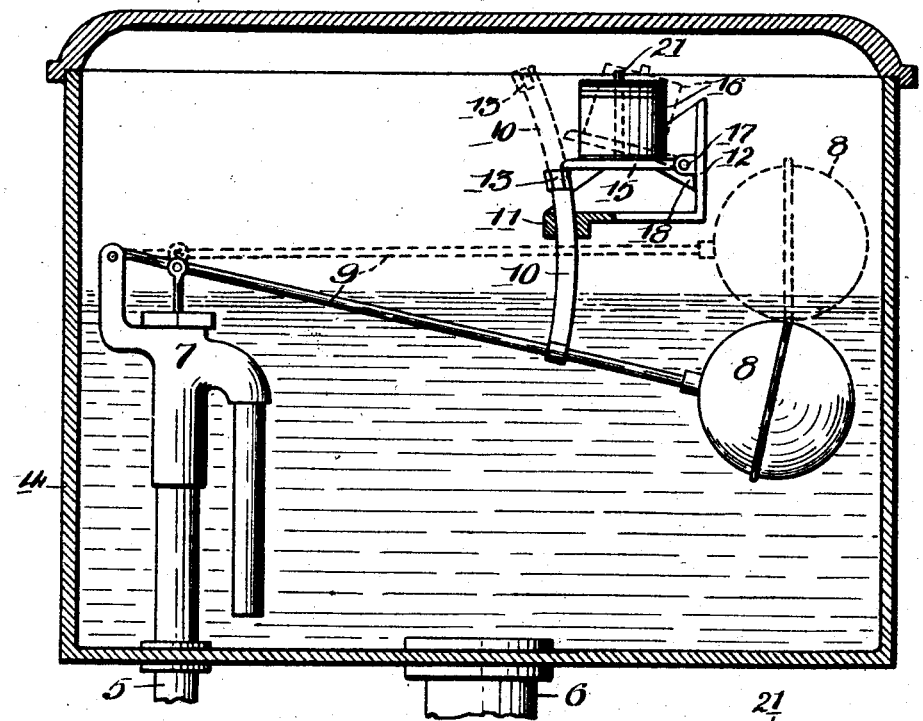
Figure 2:
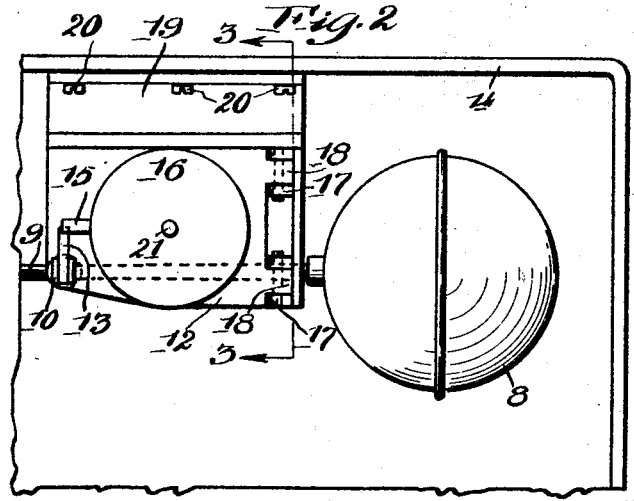
Figure 3:
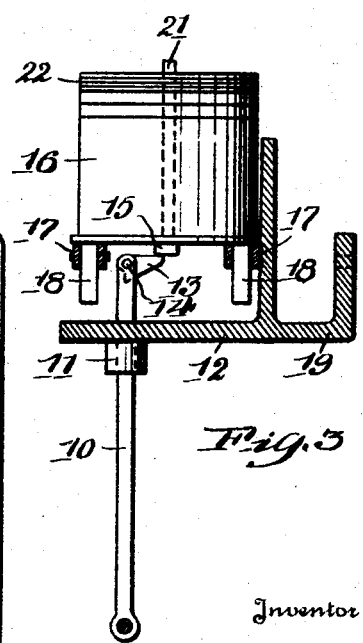

In the accompanying drawings I have illustrated the best form of my device at present known to me. Referring to the drawings, Figure 1 is a side elevation of my improved attachment mounted upon a float valve of common type, the storage tank being shown in vertical section; Fig. 2 is a plan view of the attachment on a somewhat enlarged scale and showing a fragmentary portion of the storage tank, and Fig. 3 is a section through the attachment, taken on the line 3—3 of Fig. 2.

In the drawings I have used the numeral 4 to indicate a storage tank which is adapted to be supplied with water through an inlet pipe 5 and having an outlet pipe 6. The end of the pipe 5 within the tank 4 has a valve 7 thereon of common type, adapted to be operated by a float 8 mounted on the normally free end of a rod 9. An arm 10 is rigidly secured at its lower end to the rod 9, and is slidable in a guide 11 formed on a frame 12. This frame 12 is arranged to be mounted in the tank 4 above the level of water therein. On the upper extremity of the rod 10 is a dog 13, pivoted upon a pin 14 and arranged to normally project substantially horizontally at one side of the arm 10. The dog 13 is arranged to engage one end of a tiltable support 15 for a weight 16, and is formed with a projection beneath the pin 14 adapted to prevent downward tilting of the free end of the dog. The support 15 is secured by hinges 17 to the frame 12 and has a pair of downwardly projecting lugs 18 adapted to engage said frame and normally hold the support in horizontal position. Projecting from one side of the frame 12 is a bracket 19 adapted to be secured by bolts 20 to the inner surface of the tank 4. The weight 16 is preferably provided with a central pin 21 adapted to receive a series of discs 22 of various thicknesses.

These discs 22 are removable from the pin 21, so that the amount of weight applied to the support 15 may be adjusted, as hereinafter described.

In operation, when the water is withdrawn from the tank 4, the float 8 is allowed to fall and open the valve 7, to thereby admit a fresh supply of water to the tank 4. During the emptying of the tank, the arm 10 is carried downward until the dog 13 passes the support 15 for the weight 16. Now, as will be readily understood, the float 8 is held in depressed position by the dog 13 which engages the bottom of the support 15, to thereby hold the valve in its position of maximum opening. The weight upon the support 15 is so adjusted, by adding or removing certain of the discs 22, that when the level of water has risen to substantially its maximum in the tank, the force applied by the float 8 becomes sufficient to raise the weight 16. Thus, when the tank has been filled to a predetermined level, the weight 16 is tilted to approximately the position shown in dotted lines in Figure 1, and the arm 10 is freed, so that the float rises to the position shown in dotted lines in Figure 1. When the tank is again emptied, the dog 13 is free to pass the support 15 during the downward movement of the arm 10. During the filling of the tank 4 the valve 7 is always maintained in its open position, so that free flow of water into the tank is permitted. The usual hissing caused by throttling the inflowing water is done away with and quick filling of the tank is insured.

Obviously, many changes in the construction of my device might be made within the broad scope of my invention. For example, a suitable spring or springs might be substituted for the weight 16, or two or more weights, each adapted to engage the upper end of the arm 10 might be substituted for the single weight shown.

Having described my invention what I claim as new and desire to protect by Letters Patent is:

1. The combination with a storage tank for liquid having a valved inlet pipe and a float adapted to control said valve, of means for maintaining said valve open to substantially its maximum during the filling of said tank comprising, an arm connected to said float and projecting above the same, mechanism supported in said tank adjacent to said arm adapted to exert downward pressure sufficient to substantially submerge said float and means for operatively connecting said arm to said mechanism adapted to be released from said mechanism when the liquid has risen to substantially its maximum level in the tank.

2. The combination with a storage tank for liquid having a valved inlet pipe and a float adapted to control said valve, of means for maintaining said valve open to substantially its maximum during the filling of said tank comprising, an arm connected to said float and projecting above the same, a weight supported in said tank adjacent to said arm, said weight being adapted to exert pressure sufficient to substantially submerge said float, and means for operatively connecting said arm to said weight adapted to be released from said mechanism when the liquid has risen to substantially its maximum level in the tank.

3. In an attachment for a storage tank for liquid having a valved inlet pipe adapted to be controlled by a float, a support arranged to be mounted within said tank, an arm adapted to be connected to said float and movable adjacent to said support, means adapted to operatively connect said arm and support when said float is in a depressed position, and means on said support adapted to maintain said float in depressed position until the water in said tank has reached a predetermined level therein.

4. An attachment for a storage tank for liquid having a valved inlet pipe adapted to be controlled by a float comprising, a support for a weight arranged to be mounted within said tank, a member connected to said float and movable adjacent to said support, means adapted to operatively connect said member and support when said float is in a depressed position, whereby said weight may be raised by the float when moved upward, and a weight on said support adapted to maintain said float in depressed position until the water in said tank reaches a predetermined level therein.

5. The combination with a storage tank for liquid having an inlet pipe and a valve on said pipe adapted normally to maintain water at a predetermined level in said tank, said valve being provided with a float, an arm projecting above said float and operatively connected therewith, a member extending adjacent to said arm and pivotally supported at one end in said tank, the free end of said member being adapted to engage said arm when the float is in a depressed position and means adapted to exert downward pressure on said member sufficient to maintain said member in substantially horizontal position whereby said float is maintained in depressed position upon emptying of the tank until the water has risen therein substantially to said predetermined level.

6. The combination with a storage tank for liquid having an inlet pipe and a valve on said pipe adapted normally to maintain water at a predetermined level in said tank, said valve being provided with a float, an arm projecting above said float and operatively connected therewith, a member extending adjacent to said arm and pivotally supported at one end in said tank, the free end of said member being adapted to engage said arm when the float is in a depressed position and a weight supported by said member adapted to maintain said arm depressed, whereby said float is maintained in depressed position upon emptying of the tank and until the water has risen therein substantially to said predetermined level.

In testimony whereof, I have hereunto signed my name to this specification.

THOMAS SHETKA.